United States Patent [19]

Matsumoto et al.

[11] Patent Number: 4,778,024
[45] Date of Patent: Oct. 18, 1988

[54] AUTOMATIC GUIDED VEHICLE

[75] Inventors: Yoshihiro Matsumoto, Kadoma; Nobuo Mino, Osaka; Kouichi Fujikawa, Hirakata; Norihide Higaki, Ibaraki, all of Japan

[73] Assignee: Matsushita Electric Industrial Co., Ltd., Osaka, Japan

[21] Appl. No.: 22,934

[22] Filed: Mar. 6, 1987

[30] Foreign Application Priority Data

Mar. 10, 1986 [JP] Japan .................................. 61-51740
Mar. 10, 1986 [JP] Japan .................................. 61-51741
Mar. 10, 1986 [JP] Japan .................................. 61-51742
Mar. 10, 1986 [JP] Japan .................................. 61-51744

[51] Int. Cl.$^4$ ............................................. B62D 7/00
[52] U.S. Cl. ...................................... 180/167; 180/79; 180/211; 280/91
[58] Field of Search ................. 180/79, 143, 140, 167, 180/211; 280/91; 104/244.1

[56] References Cited

U.S. PATENT DOCUMENTS

| | | | |
|---|---|---|---|
| 3,110,352 | 11/1963 | McClarnon | 180/211 |
| 3,903,983 | 9/1975 | Yeske | 280/91 |
| 3,998,288 | 12/1976 | Aoki | 280/91 |
| 4,105,086 | 8/1978 | Ishii et al. | 280/91 |
| 4,257,619 | 3/1981 | Fisher | 280/91 |

FOREIGN PATENT DOCUMENTS 0131247 1/1985 European Pat. Off. .
1473157 5/1977 United Kingdom .

Primary Examiner—Richard A. Bertsch
Attorney, Agent, or Firm—Spencer & Frank

[57] ABSTRACT

An automatic guided vehicle having three wheels consisting a front wheel and a pair of rear wheels and being capable of travelling along a track formed on a floor by a white line or aluminum foil while detecting the track by means of an optical type track sensor. The front wheel of this vehicle can be turned relative to a main body of the vehicle in response to a steering operation and can be locked in the lateral direction. The position of the pair of rear wheels can be symmetrically changed from a paralleled state to an orthogonal state relative to the center line of the main body to be maintained in these states, thereby enabling the main body to turn or laterally travel with radii of gyration determined in accordance with turning angles of the rear wheels relative to the main body on the basis of the relative turning and driving operations of the front and rear wheels.

9 Claims, 11 Drawing Sheets

AUTOMATIC GUIDED VEHICLE

BACKGROUND OF THE INVENTION

1. Field of the Invention

This invention relates to an automatic guided vehicle having three wheels: one front wheel and a pair of rear wheels, the body of the vehicle being capable of travelling by driving the wheels.

2. Discussion of the Prior Art

An automatic guided vehicle of this kind has been known, which travels along a track formed on a floor by a white line or aluminum foil while detecting the track by means of an optical track sensor. In this type of conventional vehicle having, for example, three wheels: one front wheel and a pair of rear wheels, the front wheel can be driven through a connection to a driving system and can be automatically steered by a steering system while the rear wheels are freely rotatable but incapable of being driven by any driving system being steered.

Another known example of the conventional automatic guided vehicle is a four-wheel vehicle having front and rear wheels and on the opposite sides of a center axis having left and right wheels each of which is provided with a driving motor. In this example, all wheels are set in the forward direction and the left and right wheels are driven by the driving motors so as to perform the ordinary travelling operation of the vehile. The vehicle moves straight by equalizing the speeds of rotation of the left and right wheels and turns left or right by changing the speed ratio therebetween. At least the direction of the front wheels among the front and rear wheels can be freely changed so as to follow the motion caused when the left and right wheels are steered by changing the speed ratio therebetween. If the front and rear wheels are rotated in the reverse directions at the same rotational speed while the front and rear wheels are being fixed such as to be perpendicular to the direction of the front and rear of the vehicle body, the body of the vehicle can be turned about the point of intersection of the lines which connect the front wheel to the rear wheel and the left wheel to the right wheel.

However, the former type of conventional vehicle having three wheels is designed to travel in the forward direction alone while a track sensor provided on the front wheel assembly is detecting the track, so that the vehicle cannot turn and move off the track. It is therefore necessary for the minimum radius of curvature of the track to be large enough to enable the front wheel to be steered along the track. In order to enable the vehicle to turn, it is necessary for the vehicle to go off the track and be manually turned, or to provide a looped track having the minimum radius of curvature. A large additional space is thereby required. Moreover, when there are provided a pair of parallel tracks, these tracks must be connected to each other to ensure that the vehicle can move from one of these tracks to the other.

In the case of the latter type of vehicle having four wheels, it is necessary to synchronize left and right driving motors with each other or to adjust the speed ratios of these motors in relation to the steering operation. While this type of vehicle is capable of turning on the track, it can turn only about the point of intersection of the four wheels. Also it is not capable of laterally moving off the track.

SUMMARY OF THE INVENTION

The present invention has been made in consideration of these problems, and an object of the present invention is to provide a three-wheel automatic guided vehicle capable of turning at terminal ends or desired points on a track with a minimum radius of curvature without the provision of any loop of the track and is capable of laterally travelling off of the track.

DESCRIPTION OF THE PREFERRED EMBODIMENTS

An automatic vehicle which represents the present invention will be described below with reference to the accompanying drawings.

A main body 1 of a vehicle having three wheels, that is, a front wheel 2 and a pair of rear wheels 3 and 4 is provided with a chassis 5 and a cover 6 which covers the outer surface of the main body. The front wheel 2 is adapted to be driven by a driving motor 7. A timing pulley 9 integral with a wheel bracket 8 of the front wheel 2 is driven by a steering motor 10 via a timing belt 11, to steer the front wheel 2. The wheel bracket 8 has an optical type track sensor 13 for detecting a track 12 formed on a floor by a white line or aluminum foil. The front wheel 2 is steered while the steering motor 10 is being driven in accordance with the detection of the track 12 effected by the track sensor 13.

Figure 1:
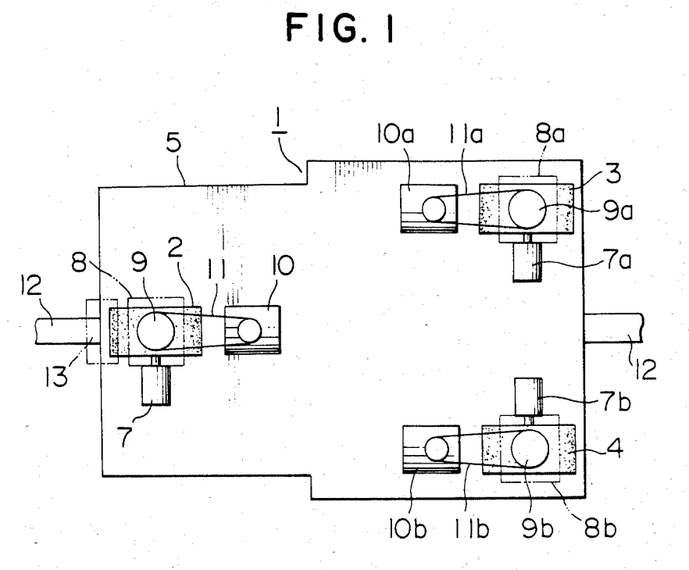
FIG. 1 is a schematic plan view of a first embodiment of the present invention.

The rear wheels 3 and 4 are provided with driving motors 7a and 7b, and are driven in a manner similar to that by which the front wheel 2 is driven such that timing pulleys 9a and 9b integral with wheel brackets 8a and 8b are driven by steering motors 10a and 10b via timing belts 11a and 11b. At the time of normal travelling, as shown in FIG. 1, the steering motors 7a and 7b for the rear wheels 3 and 4 are not driven and are disconnected therefrom by means of clutches or the like which are disposed between the rear wheels 3 and 4. Therefore, in this state, the rear wheels 3 and 4 can freely rotate. Also, in the normal travelling state, the steering motors 10a and 10b are not driven, and the rear wheels 3 and 4 are locked in the forward direction.

Figure 2:
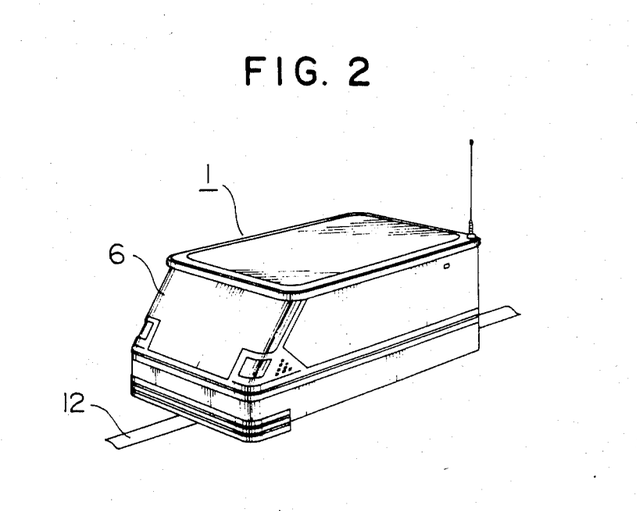
FIG. 2 is a perspective view of the external appearance of the first embodiment.

FIGS. 1 and 2 show the normally travelling state of the vehicle, in which the vehicle travels along the track 12 in the forward direction while detecting the track 12 by means of the track sensor 13. When the front wheel 2 is steered along the curved portion of the track 12, the rear wheels 3 and 4 can follow the front wheel 2 along the curved portion since they are disconnected from the driving motors 7a and 7b.

Figure 3:
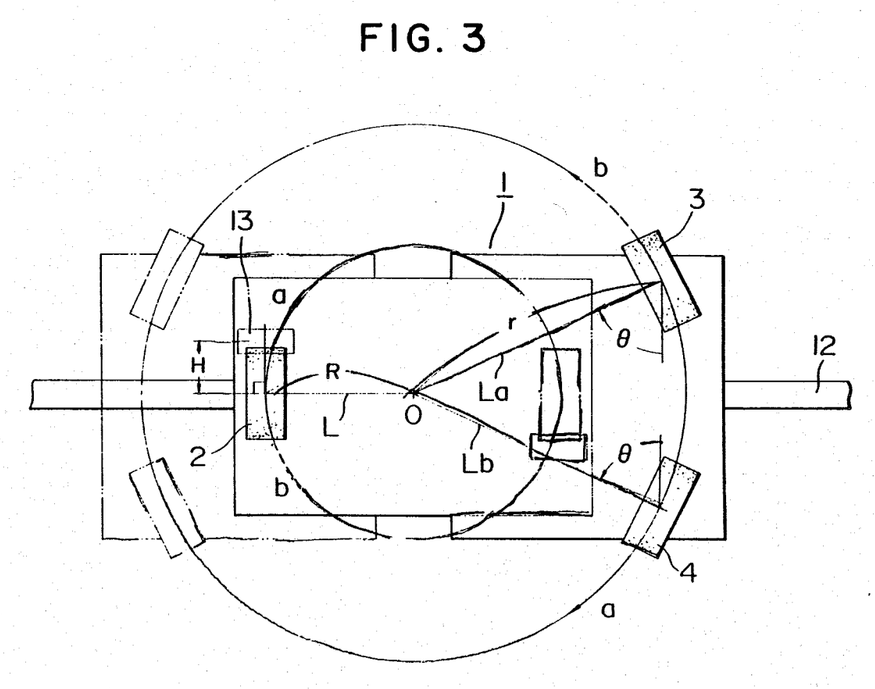
FIG. 3 is an illustration of the first embodiment at the time of turning.

The manner in which the vehicle turns at a desired point on the track 12 will be described with reference to FIG. 3. FIG. 3 shows the vehicle when it turns after it has stopped at a desired point of the track 12. That is, for the preparation of turning movement from the state shown in FIG. 1, the front wheel 2 is first turned and positioned by the actuation of the steering motor 10 such that front wheel 2 is directed perpendicularly to a center line L corresponding to the direction of the front and the rear of the main body 1 of the automatic vehicle. At the same time, the rear wheels 3 and 4 are turned by the same angle $\theta$ in the opposite directions by the actuation of the motors 10a and 10b so that the rear wheels 3 and 4 are respectively directed slantwise and symmetrically relative to the forward direction. If the point of intersection of lines La and Lb which perpendicularly pass through the center of the rear wheels 3 and 4 meets the center line of the main body 1 at point O, there the respective distances between the point O and the centers of the rear wheels 3 and 4 are equal to each other. Where this distance is r and the distance between the point O and the center of the front wheel 2 is R and if the rotational speed of the front wheel is N and that of the rear wheels 3 and 4 is n, the speed ratio may be set to satisfy the relationship with the distances R and r:

$$N = \frac{R}{r} n \qquad (1)$$

so that, when the driving motors 7 and 7a or 7b are simultaneously driven, the front wheel 2 and the rear wheels 3 and 4 can respectively be rotated with the radii of gyration R and r about the center corresponding to the point O. The speed ratio between the front and rear wheels may be set on the basis of the rotational speeds of the driving motors 7, 7a and 7b or on the basis of those at the transmission members such as gears provided between the driving motors 7, 7a and 7b and the wheels 2, 3 and 4. When the vehicle is to turn in the direction indicated by the arrow a in FIG. 3, the rear wheel 4 is driven by the motor 7b with the rear wheel 3 being kept free. It is stopped after slightly overshooting the position in which the track sensor 13 again detects the track 12 immediately before the main body 1 rotates through approximately 180° in the direction a. The position at which the rear wheel is stopped in this manner is indicated by the dash-dot line in FIG. 3. The distance between this position and the point at which the track sensor 13 detects the track 12 is determined by obtaining the turning angle of the front wheel 2 from a given distance H between the track sensor 13 and the center of the front wheel 2.

If the direction of the front wheel 2 perpendicular to the center line of the main body is reversed, the main body 1 can be turned in the direction b, as viewed in FIG. 3. In this case, the rear wheel 3 is driven by the motor 7a while the rear wheel 4 is kept free.

Figure 4:
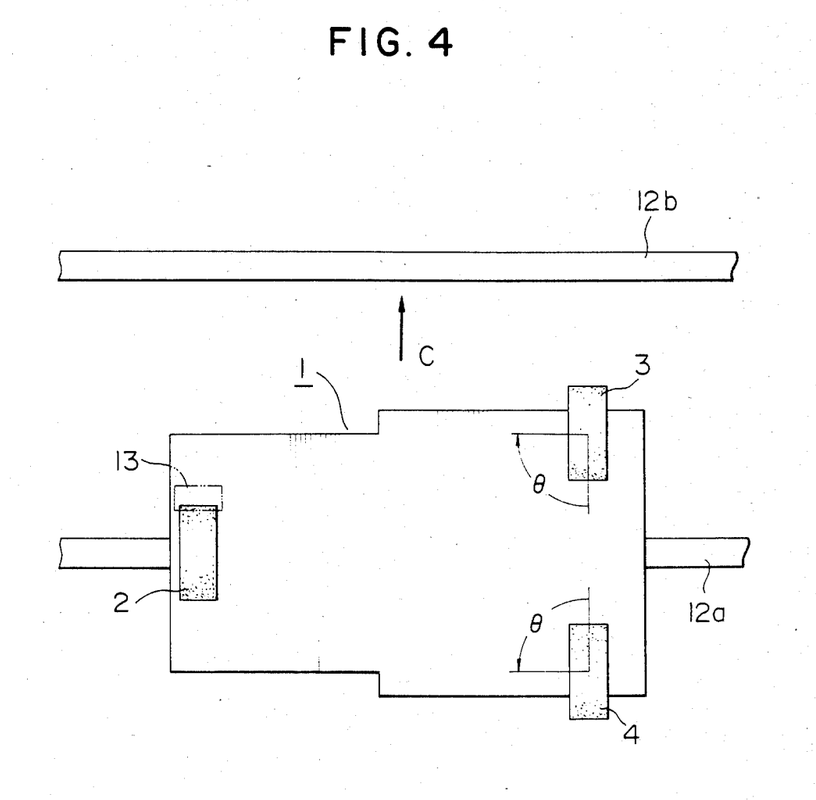
FIG. 4 is an illustration of the first embodiment at the time of travelling in a lateral direction.

FIG. 4 shows another example of the application of this embodiment in which the rear wheels 3 and 4 are driven by the steering motors 10a and 10b to set the angle $\theta$ at 90° in the same manner as that described above in relation to FIG. 3. This state means that the radii R and r are infinite. Therefore the turning operation of the main body 1 is substantially impossible. However, in this state, the front wheel 2 and the rear wheels 3 are parallel with each other, and the main body 1 can laterally travel in the direction indicated by the arrow c when the front wheel 2 and the rear wheel 3 are being driven at the same rotational speed. Accordingly, it can be moved, for example, from a track 12a to a track 12b, and it is stopped in this case in accordance with the detection of the track 12b effected by the track sensor 13, in the same manner as that described above.

Figure 5:
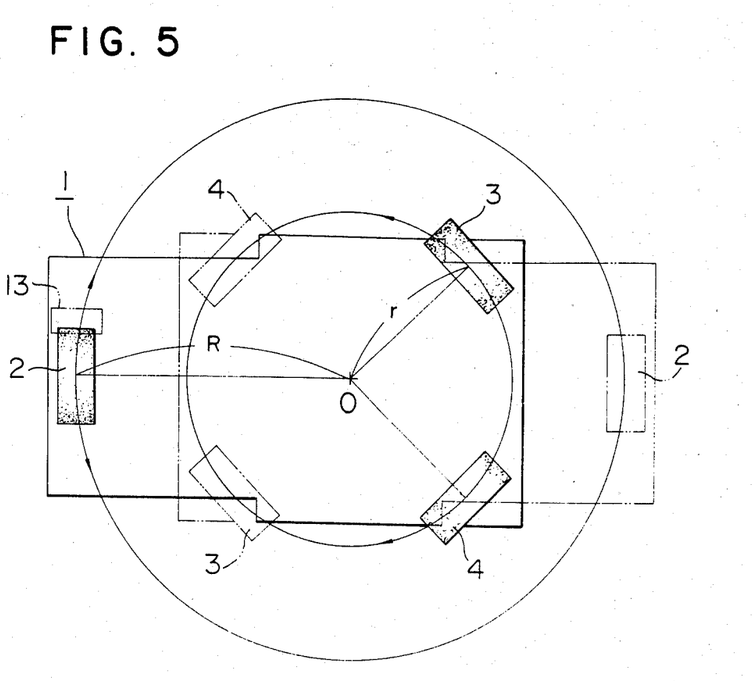
FIG. 5 is an illustration of another example of the turning operation of the first embodiment.

FIG. 5 shows still another example of the application in which the distance R is set to be larger than the distance r and the point O is displaced toward the rear wheels 3 and 4. In this case also, the speed ratio between the front wheel 2 and the rear wheels 3 and 4 is set so as to satisfy the equation (1), thereby enabling the vehicle to be turned about the point O.

It is possible to equalize the rotational speeds of the front wheel 2 and the rear wheels 3 and 4 by setting the turning angle $\theta$ of the rear wheels 3 and 4 in a manner to equalize the distances R and r. With respect to the setting of the point O, if the center of the front wheel 2 and the rear wheels 3 and 4 is shifted from the center of the main body 1 of the automatic vehicle, it is possible to minimize the radius of gyration of the main body 1 when turned by setting the point O to correspond to the center of the main body 1.

If the turning angle $\theta$ of the rear wheels 3 and 4 is set so as to position the point O forwardly of the front wheel 2, the vehicle body 1 is turned with a large radius of gyration while satisfying the speed ratio condition represented by the equation (1) and selecting and driving one of the rear wheels 3 and 4 which is directed in the same direction as that of the front wheel 2. This is not a practical manner of turning the vehicle, and the most extreme example of this state is shown in FIG. 4 wherein the distances R and r are infinite and $\theta$ is 90°.

Figure 6:
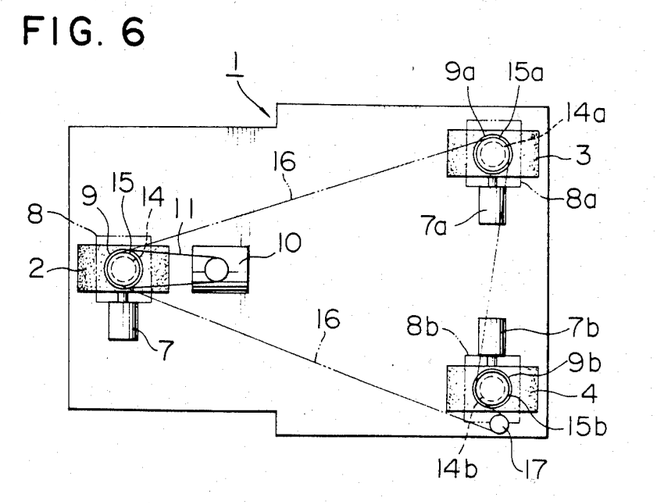
FIG. 6 is a schematic plan view of a second embodiment of the present invention.

FIG. 6 shows another embodiment of the present invention in which the steering motors 10a and 10b for the rear wheels 3 and 4 are omitted. In this embodiment, a sprocket 15 is integral with the timing pulley 9 for the front wheel 2 with an electromagnetic clutch 14 interposed therebetween. Sprockets 15a and 15b are also integral with the timing pulleys 9a and 9b for the rear wheels 3 and 4 with electromagnetic clutches 14a and 14b interposed therebetween. These sprockets 15, 15a and 15b are interconnected by a chain 16, and a sprocket 17 is provided to reverse the directions of rotation of the sprocket 15a and the sprocket 15b. While in this arrangement the electromagnetic clutches 14, 14a and 14b are connected, the steering force of the motor 10 for the front wheel 2 is transmitted to the timing pulleys 9a and 9b via the timing pulley 9, the electromagnetic clutch 14, the sprocket 15, the chain 16, the sprockets 15a and 15b and the electromagnetic clutches 14a and 14b. At this time, the pulleys 9a and 9b are rotated in reverse directions by means of the sprocket 17. Therefore, the rear wheels 3 and 4 are turned to be divergent forwardly of the main body 1 in the same manner as in the above-described case. In this case, the rotational speeds of the sprockets 15a and 15b suffice to be equalized to that of the sprocket 15 so that the timing pulleys 9a and 9b for the rear wheels 3 and 4 are turned by 90° in response to the turning movement of the front wheel 2 toward the lateral direction, namely, the turning movement of the timing pulley 9 of 90°. Also, the speed ratio of the sprockets may be changed to reduce the turning angle of the rear wheels 3 and 4 and therefore set suitably the above-described turning angle $\theta$. Each pair of the electromagnetic clutches 14, 14a and 14b and the sprockets 15, 15a and 15b may be replaced with two pairs having different speed ratios so that it is possible to select one of two different turning angles $\theta$ of the rear wheels 3 and 4 by connecting one of the electromagnetic clutches in each combination of two pairs. That is, the rear wheels are designed to be turned by utilizing the steering drive force of the front wheel 2 while taking into account of the fact that the direction of the front wheel 2 is set to be perpendicular to that of the main body during both operations of turning movement and lateral movement of the vehicle.

During the normal travelling operation of the vehicle thus constituted, the electromagnetic clutches 14, 14a and 14b are in the released state so that the turning force generated when the front wheel 2 travels is not transmitted to the rear wheels 3 and 4. When the vehicle turns or laterally travels, the electromagnetic clutches 14, 14a and 14b are actuated so that the rear wheels 3 and 4 are turned by a predetermined angle $\theta$ in response to the turning movement of the front wheel 2 in the lateral direction. During the turning movement or the lateral travelling of the vehicle, the driving motor 7 for the front wheel 2 and a selected one of the driving motors 7a and 7b for the rear wheels 3 and 4 (depending upon the direction of the turning movement or the lateral travelling) are driven to cause turning or lateral travelling of the vehicle while the front wheel 2 is maintained in a direction perpendicular to the longitudinal axis of the vehicle and the rear wheels 3 and 4 are maintained at an angle $\theta$ relative to the longitudinal axis of the vehicle.

Figure 7:
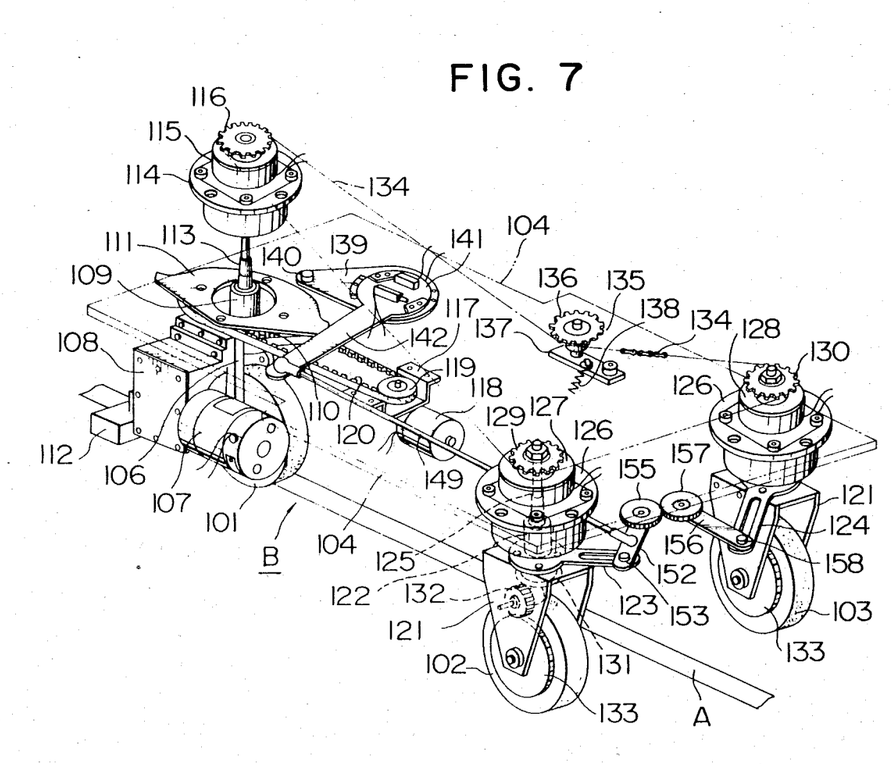
FIG. 7 is an exploded perspective illustration of the general construction of the second embodiment.
Figure 8:
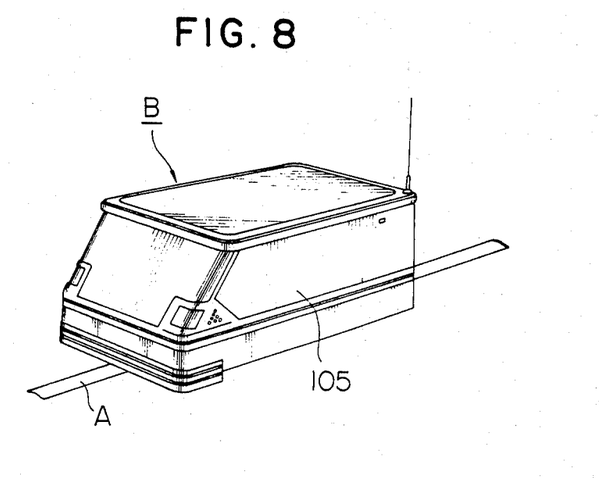
FIG. 8 is an illustration of the external appearance of the second embodiment.
Figure 9:
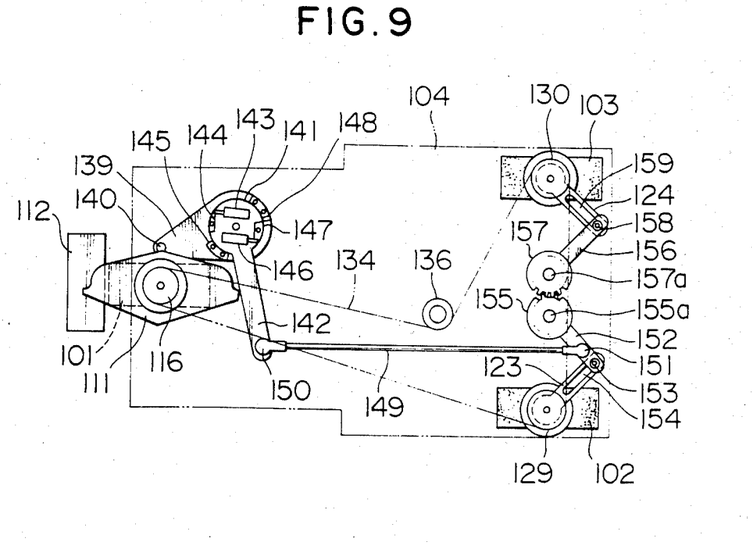
FIG. 9 is a schematic plan view of the second embodiment.

FIG. 7 shows an exploded perspective view of the general construction of an automatic vehicle according to a second embodiment of the present invention; FIG. 8 shows an illustration of the external appearance of this vehicle; and FIG. 9 shows a schematic plan view of this vehicle at the time of normal travelling. The automatic guided vehicle of this embodiment travels along a track A formed on a floor by a white line or aluminum foil, and comprises a front wheel 101, a pair or rear wheels 102 and 103, and a main boy B which includes a chassis 104 and a cover 105. On a wheel bracket 106 of the front wheel 101 are mounted a motor 107 for driving the front wheel 101, a gear box 108 of the motor 107, a steering shaft 109, a timing pulley 110 and steering cam 111 provided integral on the steering shaft 109, an optical type track sensor 112, and so forth. A drive shaft 113 to which the driving force of the driving motor 107 is transmitted via the gear box 108 extends through the steering shaft 109 and is connected to a sprocket 116 by an electromagnetic clutch 115 which is mounted on the bracket 114.

The timing pulley 110 is normally operated and rotated via a timing belt 120 by a pulley 119 which is driven by a steering motor 118 mounted on a metal support member 117. These members constitute a steering drive assembly. The steering motor 118 is normally driven in accordance with a steering command issued upon the detection of the track A on the floor by the track sensor 112, and the timing pulley 110 is correspondingly rotated to control, via the wheel bracket 106, the direction of the steering of the front wheel 101 and simultaneously rotate the steering cam 111.

The assemblies including the rear wheels 102 and 103 are constructed as described below. Some parts of the assembly of the rear wheel 102 are illustrated as if they are transparent to show the internal construction. The rear wheels 102 and 103 are respectively supported by wheel brackets 121 and have steering shafts 122 formed integral with the wheel brackets 121, and slide arms 123 and 124 mounted therewith. Drive shafts 125 extend through the steering shafts 122, and have the upper portions thereof connected to sprockets 129 and 130 by electromagnetic clutches 127 and 128 which are mounted on brackets 126, and the lower portions thereof arranged such that gears 133 mounted on the rear wheels 102 and 103 are driven via bevel gears 131 and pinion gears 132. The sprockets 129 and 130 are connected to the sprockets 116 via a roller chain 134, so that the torque of the driving motor 107 is transmitted when the electromagnetic clutch 115 is connected. A chain tensioner 135 for tensioning the roller chain 134 has an arm 137 with a sprocket 136, and a spring 138 which is adapted to maintain a constant tension of the roller chain 134.

A swing plate 139 acts to detect the state of the steering operation in response to the rotation of the steering cam 111, and is provided at its top end with a cam follower 140 which follows in contact with the peripheral surface of the cam 111. The swing plate 139 rotatably supports a clutch plate member 141 which is coaxial with the center of rotation of the swing plate 139 and which is provided integral with an arm 142. An engaging click member 144 which is rotated by a plunger 143 is provided on the clutch plate member 141 to be engageable with a stop piece 145 on the swing plate 139, and an engaging click member 147 which is rotated by a plunger 146 is disposed to be engageable with a stop piece 148. The range of the turning angle of the arm 142 corresponding to the turning angle of the swing plate 139 is determined depending upon which one of these pairs of engaging members are engaged with each other. The swinging operation of the arm 142 will be described below with reference to FIGS. 10a and 10b which show this relationship. As the steering cam 111 rotates in the direction indicated by the arrow (clockwise direction), the swing plate 139 is correspondingly turned by an angle $\theta$ about its rotational axis 139a to a position where one engaging end 111a of the engaging ends of the cam 111 is engaged with the cam follower 140 after the cam 111 has rotated for 90° (that is, the position where the front wheel 101 is turned to the right to be perpendicular to the main body). In the state shown in FIG. 10a, the turning angle $\alpha_1$ of the arm 142 relative to the turning angle $\theta$ of the swing plate 139 is represented by $\alpha_1 = \theta - \theta_1$, because there is a play angle $\theta_1$ between the tip of the engaging click member 144 and the stop piece 145. On the other hand, in the state shown in FIG. 10b, there is no play between the tip of the engaging click member 147 and the stop piece 148, so that the turning angle $\alpha_2$ of the arm 142 is represented by $\alpha_2 = \theta$. Therefore, it is possible to select one of the turning angles $\alpha_1$ and $\alpha_2$ of the arm 142 by preliminarily selecting one of the plungers 143 and 146 to operate the engaging click member 144 or 147 before the cam 111 rotates. If both the plungers 143 and 146 are not selected upon rotation of the cam 111 and there is no engagement between the engaging click members 144 and 147 and the stop pieces 145 and 148, the arm 142 is not turned by the rotation of the cam 111. If steering is effected leftward, the cam 111 rotates in the direction (anti-clockwise direction) reverse to that indicated by the arrow and the other engaging end 111b of the cam 111 is engaged with the cam follower 140 when the front wheel 101 is positioned to be directed to the left and perpendicular to the main body. In this case also, the swing plate 139 and other related members are moved in the same manner as described above.

A rod 149 is rotatably connected to the top end portion 150 of the arm 142, and the other end 151 of the rod 149 is connected to the intermediate portion of an contact arm 152. The contact arm 152 has at its one end a shaft 153 which is slidably fitted into a slot 154 formed in the slide arm 123 securely mounted on the steering shaft 122 of the rear wheel 102. The contact arm 152 has its other end a gear 155 which is not rotatable relative to the contact arm 152. The gear 155 is engaged with a gear 157 which is non-rotatably mounted at one end of another contact arm 156. The contact arm 156 has its other end a shaft 158 which is slidably fitted into a slot 159 formed in the slide arm 124 securely mounted on the steering shaft 122 of the rear wheel 103.

With the arrangement described above, the brackets 115, 126 and 127, metal support member 117, a shaft 155a for the gear 155, a shaft 157a for the gear 157, and so forth are mounted on the chassis 104 in a suitable manner. A biasing force (not shown) which normally acts in the anticlockwise direction is applied to the swing plate 139 and to the arm 142.

Next, the operation of the automatic guided vehicle thus constituted in accordance with the present invention will be described below.

At the time of normal travelling, the states of the front wheel 101 and the rear wheels are shown in the plan view of FIG. 9. In this case, the electromagnetic clutches 115, 127 and 128 are in the released states, so that the sprocket 116 is not rotated and the driving force of the driving motor 107 is not transmitted to the rear wheels 102 and 103 while only the front wheel 101 is being driven. At this time, the track A is detected by the track sensor 112, and the vehicle travels along the track A. During this normal travelling operation, the plungers 143 and 146 are not operated, so that, even if the cam 111 rotates to turn the swing plate 139 when the front wheel 101 is steered to the left or right at a curved portion or the like of the track A, the turning force of the swing plate 139 is not transmitted to the arm 142. Therefore, the rod arm 149 is not moved; and the contact arms 152 and 156 and slide arms 123 and 124 are maintained in the states as shown in FIG. 9. The rear wheels 102 and 103 are locked in the forward direction; and the rear wheels 102 and 103 can be freely rotated in accordance with the released state of the electromagnetic clutches 127 and 128.

Figure 10A:
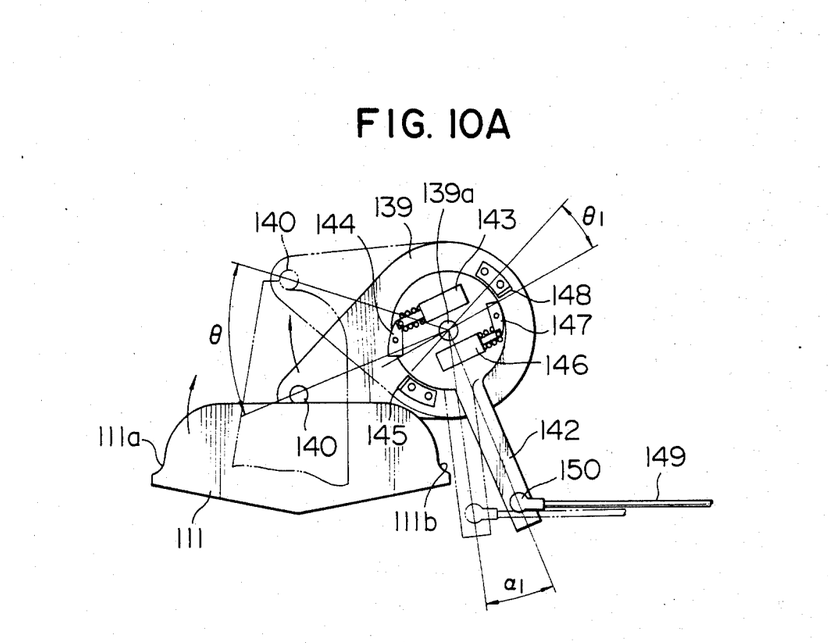
FIGS. 10a and 10b are enlarged illustrations of an essential part of the second embodiment showing movement of the part.
Figure 11:
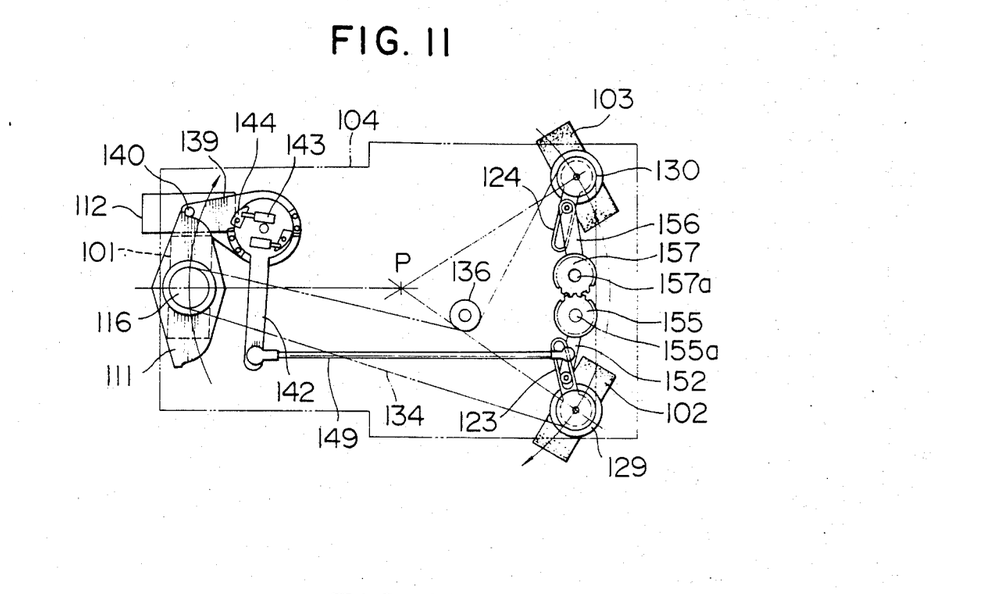
FIG. 11 is a schematic plan view of the second embodiment at the time of spinning turn.

Next, the operation of spinning turn will be described below. When the vehicles makes a spinning turn, namely, a turn about a fixed point on it, the plunger 143 is operated previously or at the time of start of the operation, thereby outwardly projecting the engaging click member 144. The front wheel 101 is perpendicularly set in a desired direction (the direction of the spinning turn) by being driven by the steering motor 118 via the steering shaft 109 while the swing plate 139 is being turned by the steering cam 111 to turn the arm 142 by the angle $\alpha_1$, as shown in FIG. 10a. The rod 149 is pulled by the turning movement of the arm 142, and the contact arm 152 is pulled by the rod 149 to turn about the shaft 155a. The shaft 153 is simultaneously slid in the slot 154 to turn the slide arm 123 while the rotational movement of the gear 155 is transmitted to the gear 157, thereby turning the contact arm 156 so as to similarly turn the slide arm 124 via the shaft 158 and the slot 159. Both the slide arms 123 and 124 are thus turned and are held in positions shown in FIG. 11. At this time, the rear wheels 102 and 103 are divergent in the forward direction of the main body B, and they are positioned in such a manner that, if a point of intersection at which lines perpendicularly extending through the wheels 101, 102 and 103 at the centers thereof meet each other is represented by P, the distances between the point P and the respective wheels 101, 102 and 103 are equal to one another. If at this time the electromagnetic clutches 115 and 127 are in the connected states, the driving force of the driving motor 107 is also transmitted to the rear wheel 102 as well as to the front wheel 101, and the main body can turn about the point P provided that the reduction ratio is set so as to equalize the peripheral speeds of the wheels 101 and 102 to each other.

Figure 13:
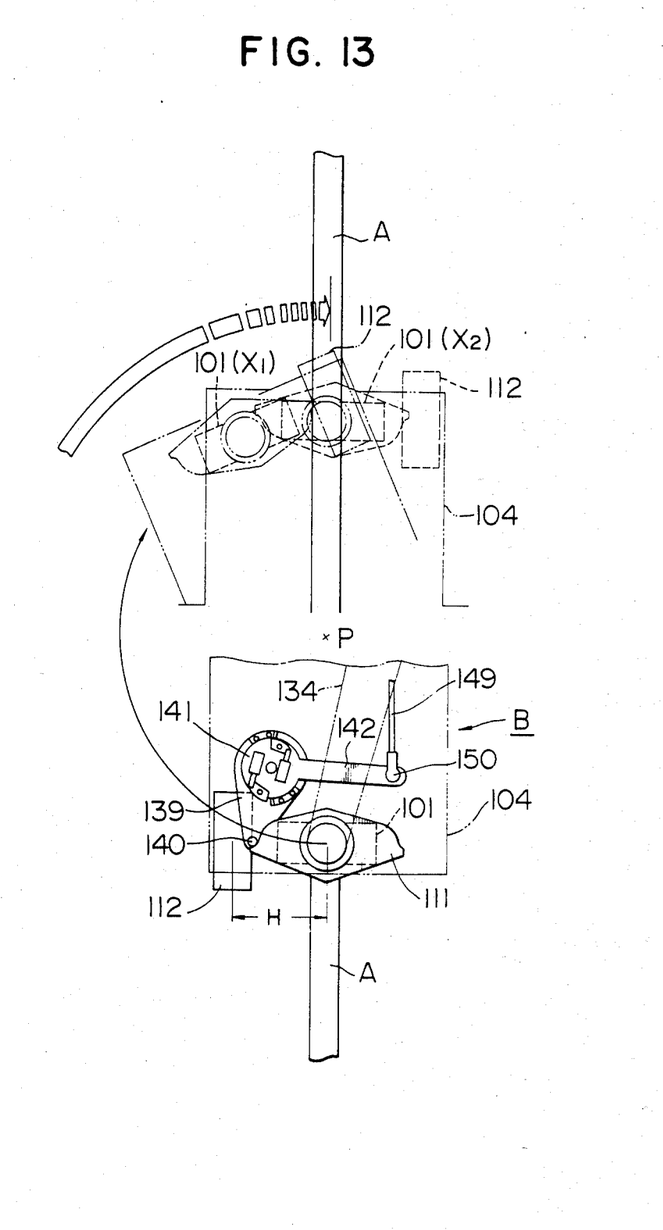
FIG. 13 is an illustration of the movement of the second embodiment at the time of spinning turn.

The main body B of the automatic guided vehicle is thus caused to effect a spinning turn as shown in FIG. 13. When the main body B of the automatic guided vehicle is caused to effect the clockwise spinning turn from the downward direction to the upward direction as viewed in FIG. 13, the front wheel 101 and the rear wheel 102 are driven by the driving motor 107 while the front wheel 101 and the rear wheels 102 and 103 are maintained in directions of steering, thereby turning the main body about the point P. During this turning operation, the track sensor 112 continues to detect the track A, and detects the track A when the front wheel 101 reaches a position $X_1$ after turning in the clockwise direction as shown in FIG. 13. A command is output in response to the detection signal and is sent to a control circuit for the driving motor 107, thereby initiating the slowdown operation of the driving motor 107. The motor is stopped when the front wheel reaches a position $X_2$ after moving through a predetermined distance. The distance between the slowdown point and the point at which the front wheel is stopped is set to be equal to the distance H between the track sensor 112 and the front wheel 101. That is, the turning angle of the front wheel may be set such that the front wheel 101 stops after moving to the extent corresponding to the distance H. This angle is calculated by, for example, counting the pulse outputs from a rotary encoder disposed on the driving shaft of the front wheel 101. When the front wheel 101 is stopped on the track A in this manner, the stopped state is detected to cause release of the electromagnetic cluthces 115 and 127, and the steering motor 118 is driven so that the front wheel is directed toward the front of the main body. Then, when the track sensor 112 detects the track A, the steering operation is terminated and the normal travelling operation is again effected, thus finishing the spinning turn. At this time when the front wheel is returned to the position in the forward direction, the steering cam 111 is turned, and the swing plate 139 and the arm 142 are returned by the above-described urging force. Accordingly, the rear wheels 102 and 103 are also returned by the operations of the rod 149, the arms 123 and 152, the gears 155 and 157, the arms 124 and 156 to the state in which they are directed to the front, as shown in FIG. 9, thereby enabling the normal travelling.

Figure 10B:
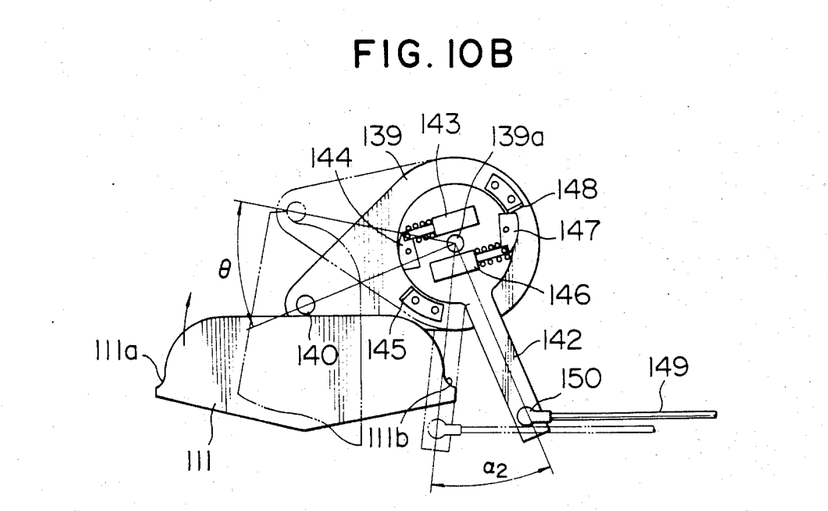
Figure 12:
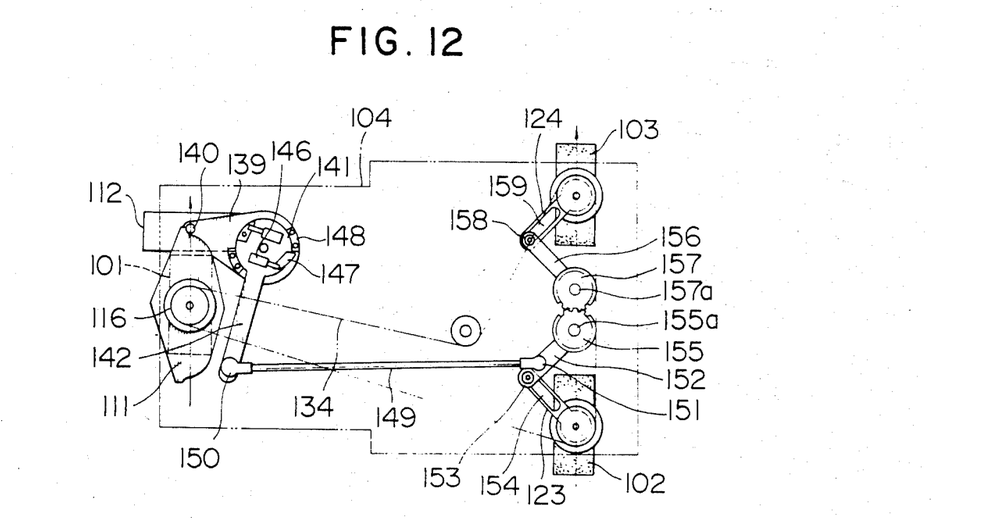
FIG. 12 is a schematic plan view of the second embodiment at the time of travelling in the lateral direction.

Next, the operation of lateral travelling will be described. When the main body B of the automatic guided vehicle is moved laterally, that is, in the lateral direction relative to that of the normal travelling, the plunger 146 is operated previously or at the time of start of the operation, thereby outwardly projecting the engaging click member 147. The front wheel 101 is perpendicularly set in a desired direction (the direction of the lateral travelling) by being driven by the steering motor 118 via the steering shaft 109 while the swing plate 139 is being turned by the steering cam 111 to turn the arm 142 by the angle $\alpha_2$, as shown in FIG. 10b. The rod 149 is pulled by this turning movement of the arm 142, and the contact arm 152 is pulled by the rod 149 to an extent larger than that in the case of the above-described spinning turn, resulting in the state shown in FIG. 12. In this state, the slide arm 123 and the contact arm 152 are generally perpendicular to each other. The contact arm 156 and the slide arm 124 are also set to be made perpendicular to each other by being turned via the gears 155 and 157. At this time, the rear wheels 102 and 103 are made perpendicular to the forward direction of the main body B after being turned via the slide arms 123 and 124 and the wheel brackets 121. Therefore, if at this time the electromagnetic clutches 115 and 128 are in the connected states, the driving force of the driving motor 107 is transmitted to the rear wheel 103 as well as to the front wheel 101. These wheels are simultaneously rotated to enable lateral travelling.

Figure 14:
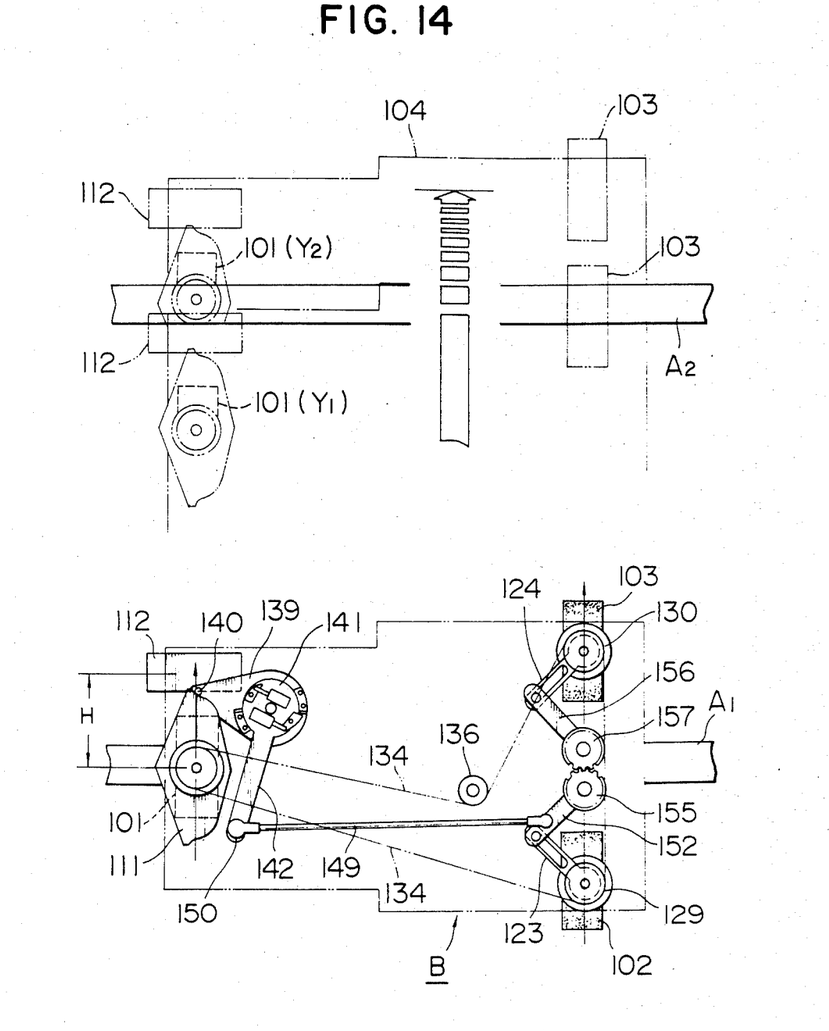
FIG. 14 is an illustration of the movement of the second embodiment at the time of travelling in a lateral direction.

The operation of lateral travelling is conducted as shown in FIG. 14. When the main body B of the automatic vehicle is to be laterally moved from a track $A_1$ to a track $A_2$, rotation of the front wheel 101 and the rear wheel 103 caused by the driving force of the driving motor 107 with the front wheel 101 and the rear wheels 102, 103 maintained in the steering direction causes the automatic guided vehicle to start lateral travelling from the track $A_1$ to the track $A_2$. During this turning operation, the track sensor 112 continues to act and is laterally moved to a position where the sensor 112 detects the track $A_2$ (corresponding to a position $Y_1$ of the front wheel 1), thereby issuing a command to the control circuit of the driving motor 107 and initiating the slow-down operation of the driving motor 107. The motor 107 is stopped when the front wheel 101 reaches a position $Y_2$ (a position on the track $A_2$) after the vehicle has moved through a predetermined distance. The principle of this operation is the same as that in the case of the above-described spinning turn. When the front wheel 101 is stopped on the track $A_2$ in this manner, this is detected to cause release of the electromagnetic clutches 115 and 128, and the steering motor 118 is driven so that the front wheel 101 is directed toward the front of the main body. Then, the vehicle is steered and stopped at a position where the sensor 112 having been deviated from the track $A_2$ detects the track $A_2$. The vehicle thereby resumes the position for the normal travelling, thus finishing the operation of lateral travelling. At this time, the rear wheels 102 and 103 are returned to the state as shown in FIG. 9 in the same manner as that in the case of the above-described spinning turn, thereby enabling the normal travelling along the track $A_2$.

The present invention will now be described with respect to still another embodiment of the present invention with reference to FIGS. 15a, 15b, 16a and 16b. In this embodiment, the above-described link mechanism and angle setting mechanism for changing the angles of the rear wheels 102 and 103 relative to the main body B of the automatic vehicle via the clutch plate member 141 and the integral arm 142 on the swing plate 139, and the rod 149 are replaced with other mechanisms. That is, sprockets 160 and 161 are mounted on a shaft 139b integral with the swing plate 139 which acts to detect the state of steering. These sprockets are selectively connected to the shaft 139b of the swing plate 139 for rotation therewith by means of electromagnetic clutches 162 and 163. Each of the steering shafts 122 of the rear wheels 102 and 103 has secured thereon a pair of sprockets 164 and 165. The sprockets 160 and 164 are connected with each other by a roller chain 166, and the sprockets 161 and 165 are connected by a roller chain 167. Sprockets 168 are adapted to reverse the direction of rotation of one of the sprockets 164 of the rear wheels 102 and 103 relative to the other and also reverse the rotational direction of the sprockets 165 of these wheels. The sprockets 168 are respectively provided for the roller chains 166 and 167. The diameters of the sprockets 160 and 161 are different from each other in order to change the turning angles of the sprockets 164 and 165 relative to the turning angle (the above-described angle $\theta$) of the swing plate 139 set by the cam 111. The sprocket 160 functions to effect a spinning turn, and the sprockets 161 functions to effect lateral travelling. When these sprockets are disengaged from the swing plate 139, the vehicle moves in the manner of normal travelling.

Figure 15A:
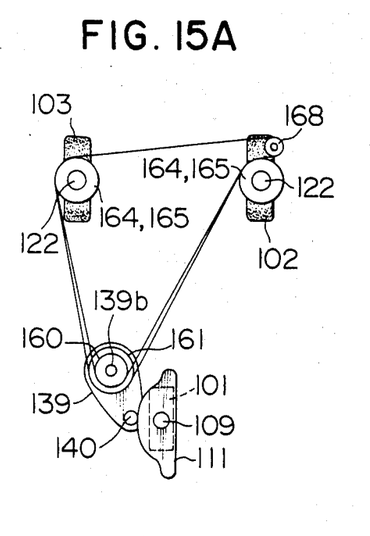
FIGS. 15a and 15b are schematic illustrations of a third embodiment of the present invention.
Figure 15B:
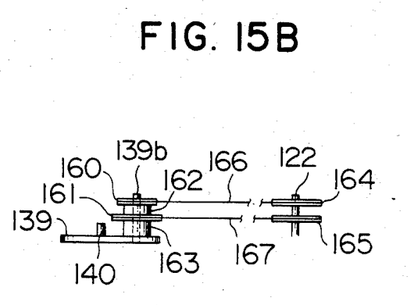
Figure 16A:
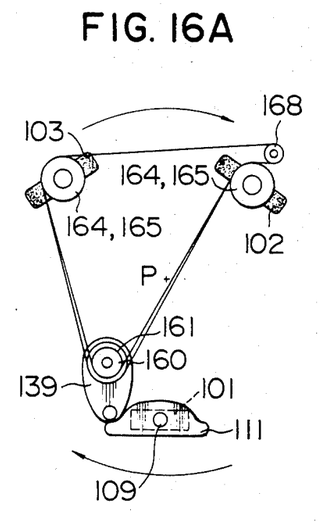
FIGS. 16a and 16b are schematic illustrations of the third embodiment at the time of spinning turn and travelling in a lateral direction.
Figure 16B:
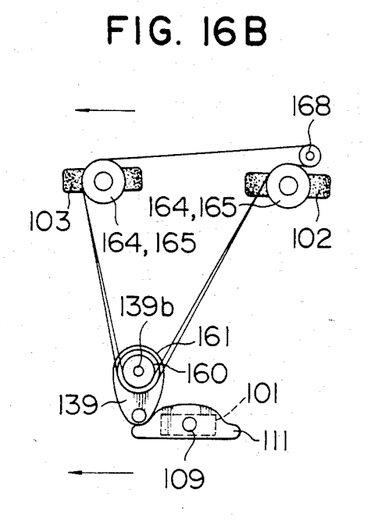

The operation of this embodiment shown in FIGS. 15a, 15b, 16a and 16b will now be described. FIG. 15a shows the state of normal travelling in which the sprockets 160 and 161 are not connected to the shaft 139b by the action of the electromagnetic clutches 162 and 163, so that, when the front wheel 101, hence, the cam 111 is turned in accordance with the steering operation, the turning force thereof is not transmitted to the rear wheels 102 and 103. When the automatic guided vehicle makes a spinning turn, the front wheel 101 is driven and turned by the steering motor 118 to be made perpendicular to the main body B of the vehicle. If at this time the sprocket 160 has been connected to the shaft 139b by the operation of the electromagnetic clutch 162, the rear wheels 102 and 103 are turned via the sprocket 160, the chain 166 and the sprockets 164 as the swing plate 139 turns. The rear wheels are thereby positioned to be divergent in the forward direction of the main body B of the vehicle, as shown in FIG. 16a. When in this state the front wheel 101 and the rear wheel 102 are driven, the vehicle turns about the point P to effect a spinning turn in the same manner as that in the case of the above-described embodiments. At the time of lateral travelling, the rear wheels are turned in response to the turning movement of the front wheel 101 to laterally direct the vehicle as shown in FIG. 16b, provided that the sprocket 161 has been connected to the shaft 139b by the operation of the electromagnetic clutch 163. In this state, the vehicle can laterally travel in the same manner as that in the case of the above-described embodiments.

In the embodiment shown in FIGS. 15a, 15b, 16a and 16b components and operations other than those of this link mechanism are the same as those of the abovedescribed embodiments. In this embodiment, with respect to the relationship between the sprockets 160 and 161, and 164 and 165, the diameters thereof are set so that the change of the turning angle 8 of the swing plate 139 corresponds to the predetermined change of the angles of the rear wheels 102 and 103 (that is, the rear wheels are directed to be divergent or to be perpendicular to the main body B).

This type of link mechanism may be constituted without using the cam 111 and the swing plate 139. For example, members similar to the sprockets 160 and 161 and the electromagnetic clutches 162 and 163 provided in the above-described embodiment may be mounted on the steering shaft 109 and operated in a manner similar to that described above, thereby steering the rear wheels.

What is claimed is:

1. An automatic guided vehicle for movement across a surface having a main body including front and rear portions, said vehicle having a longitudinal axis, comprising:
   a front wheel located at the front portion of said main body;
   a pair of rear wheels located at the rear portion of said main body;
   front and rear support members connected to said main body, said front wheel being rotatable within said front wheel support member and said rear wheels being rotatable within said rear wheel support members about axes of rotation extending substantially parallel to said surface;
   a steering shaft mounted on said front wheel support member;
   a steering drive means mounted on said main body, said steering drive means being operatively connected with said steering shaft for rotation of said front wheel about an axis perpendicular to said surface;
   a steering state detecting means operatively connected with said main body for detecting movement of said steering shaft caused by said steering drive means;
   a link mechanism operatively connected to said steering state detecting means;
   a travel drive means for driving said front and rear wheels across said surface;
   electromagnetic clutch means, said electromagnetic clutch means being disposed between part of said travel drive means and each of said rear wheels; and
   a rear wheel angle setting means for rotating and maintaining each of said rear wheels about an axis perpendicular to said surface, said rear wheel angle setting means being controlled by and operatively connected with said steering drive means and said steering state detecting means through said link mechanism; whereby
   said vehicle can travel forward, laterally or turn; when turning, said front and rear wheels are positioned at angles to said longitudinal axis, and said electromagnetic clutches are engaged so that the driving force of said travel driving means is transmitted to said rear wheels; and when travelling laterally, said front and rear wheels are positioned at an angle to said longitudinal axis, and at least one of said electromagnetic clutches is engaged so that the driving force of said travel drive means is transmitted to at least one of said rear wheels.

2. An automatic guided vehicle as defined in claim 1, wherein each of said rear wheels are rotatable about an axis perpendicular to said surface between a first position parallel to said longitudinal axis and a second position which is transverse to said longitudinal axis, said rear wheels being positionable so that the position of one of said rear wheels is a mirror image of the other of said rear wheels across said longitudinal axis.

3. An automatic guided vehicle as defined in claim 1, wherein said front and rear wheels each have a respective transverse axis, and wherein when turning, at least two of said front and rear wheels are driven with radii of gyration equaling the distance between said front and rear wheels and a point of intersection of the transverse axes of said front and rear wheels.

4. An automatic guided vehicle as defined in claim 1, wherein the rotational speed N of said front wheel is:

$$N = \frac{R}{r} n$$

wherein when turning, R represents the radius of gyration of said front wheel about a predetermined axis perpendicular to said surface, R represents the radius of gyration of a rear wheel about said predetermined axis and, n represents the rotational speed of said rear wheels.

5. An automatic guided vehicle as defined in claim 1, wherein said main body is able to turn about an axis perpendicular to said surface located at the point of intersection of each of said axes of rotation when said front and rear wheels are positioned for turning.

6. An automatic guided vehicle as defined in claim 1, wherein said steering state detecting means includes a first setting means for limiting the movement of said steering state detecting means so that said rear wheels are positioned at angle to said longitudinal axis when said front wheel is positioned transverse to said longitudinal axis, and a second setting means for limiting the movement of said steering state detecting means so that said rear wheels are positioned transverse to said longitudinal axis.

7. An automatic guided vehicle as defined in claim 1, wherein each said electromagnetic clutch is released during forward travel to prevent the driving force of said travel drive means from being transmitted to said rear wheels.

8. An automatic guided vehicle as defined in claim 1, further comprising a further electromagnetic clutch disposed between part of said travel drive means and said front wheel.

9. An automatic guided vehicle for movement across a surface having a main body including front and rear portions, said vehicle having a longitudinal axis, comprising:
   only one front wheel located at the front portion of said main body;
   a pair of rear wheels located at the rear portion of said main body;
   front and rear support members connected to said main body, said front wheel being rotatable within said front wheel support member and said rear wheels being rotatable within said rear wheel support members about axes which are substantially parallel to said surface;

a steering shaft mounted on said front wheel support member;

a steering drive means mounted on said main body, said steering drive means being operatively connected with said steering shaft for rotation of said front wheel about an axis perpendicular to said surface;

a steering state detecting means operatively connected with said main body for detecting movement of said steering shaft caused by said steering drive means;

a link mechanism operatively connected to said steering state detecting means;

a travel drive means for driving said front and rear wheels across said surface;

clutch means, said clutch means being disposed between part of said travel drive means and each of said rear wheels; and a rear wheel angle setting means for rotating and maintaining each of said rear wheels about an axis perpendicular to said surface, said rear wheel angle setting means being controlled by and operatively connected with said steering drive means and said steering state detecting means through said link mechanism; whereby said vehicle can travel forward, laterally or turn; when turning, said front and rear wheels are positioned at angles to said longitudinal axis, and said clutches are engaged so that the driving force of said travel driving means is transmitted to said rear wheels; and when travelling laterally, said front and rear wheels are positioned at an angle to said longitudinal axis, and at least one of said clutches is engaged so that the driving force of said travel, drive means is transmitted to at least one of said rear wheels.

* * * * *